(12) United States Patent
Hunter

(10) Patent No.: US 7,255,328 B2
(45) Date of Patent: Aug. 14, 2007

(54) LOW FRICTION COATINGS FOR DYNAMICALLY ENGAGING LOAD BEARING SURFACES

(75) Inventor: Rick C. Hunter, Friendswood, TX (US)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 11/214,433

(22) Filed: Aug. 29, 2005

(65) Prior Publication Data

US 2006/0043327 A1 Mar. 2, 2006

Related U.S. Application Data

(60) Provisional application No. 60/605,176, filed on Aug. 27, 2004.

(51) Int. Cl.
*F16K 3/00* (2006.01)
(52) U.S. Cl. ............ 251/326; 251/368; 977/963; 137/375
(58) Field of Classification Search ........ 251/326, 251/368; 137/375
See application file for complete search history.

(56) References Cited

U.S. PATENT DOCUMENTS

| | | | |
|---|---|---|---|
| 3,633,873 A | 1/1972 | Lepold, Jr. et al. | |
| 3,749,114 A * | 7/1973 | Johnstone et al. | 137/244 |
| 3,763,880 A | 10/1973 | Leopold, Jr. et al. | |
| 4,991,822 A | 2/1991 | Enke | |
| 5,762,089 A | 6/1998 | Haeberle et al. | |
| 5,888,638 A | 3/1999 | Kleinhans et al. | |
| 6,375,157 B1 * | 4/2002 | Van de Lande | 251/327 |
| 6,672,330 B2 | 1/2004 | Chigasaki et al. | |
| 2004/0118455 A1 * | 6/2004 | Welty et al. | 137/375 |
| 2005/0109502 A1 | 5/2005 | Slay et al. | |

\* cited by examiner

*Primary Examiner*—J. Casimer Jacyna
(74) *Attorney, Agent, or Firm*—Bracewell & Giuliani LLP

(57) ABSTRACT

A gate valve has a body, the body having a cavity and a flow passage intersecting the cavity. A seat ring is mounted to the body at the intersection of the flow passage and the cavity, the seat ring having an engaging face. A gate in the cavity has an engaging face that slidingly engages the face of the seat ring while being moved between open and closed positions. A polymer coating is on at least one of the faces. The polymer contains a quantity of carbon nanotubes for stiffening.

21 Claims, 2 Drawing Sheets

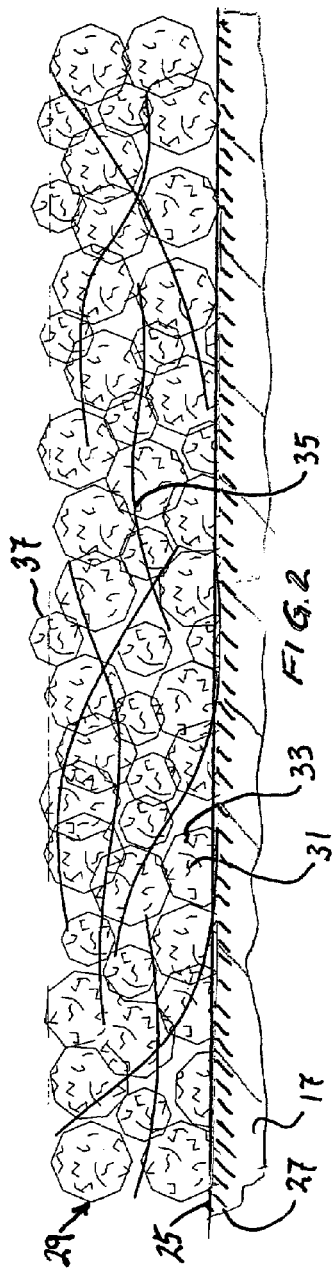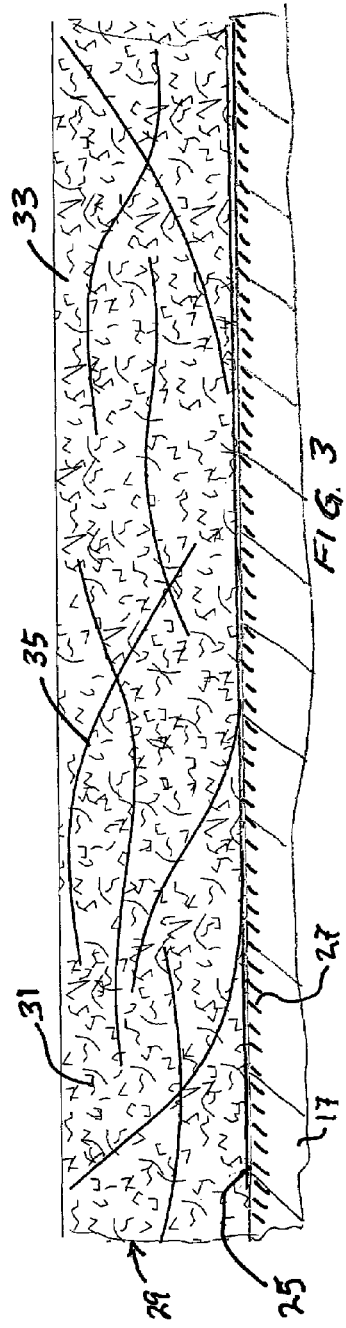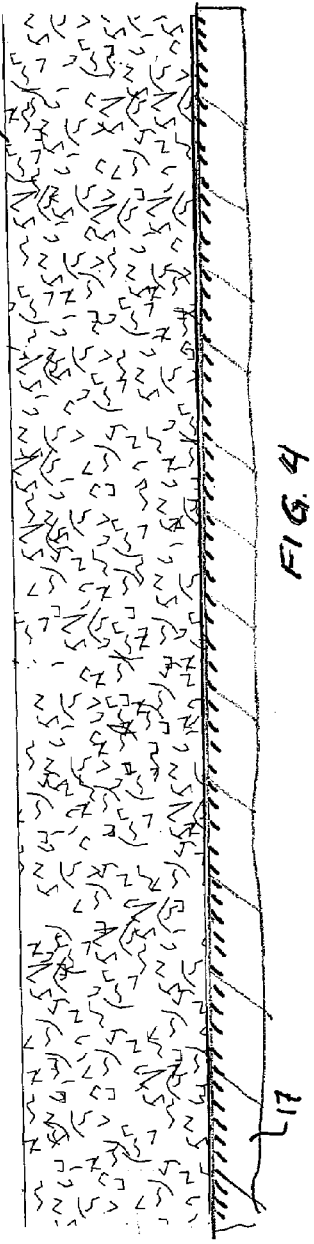

LOW FRICTION COATINGS FOR DYNAMICALLY ENGAGING LOAD BEARING SURFACES

CROSS-REFERENCE TO RELATED APPLICATION

This application claims priority to provisional application 60/605,176, filed Aug. 27, 2004.

FIELD OF THE INVENTION

The invention relates generally to low friction coatings formed on load bearing surfaces that slidingly engage each other, such as a gate and seat ring of a gate valve for a wellhead assembly.

BACKGROUND OF THE INVENTION

Gate valves are used when a straight-line flow of fluid and minimum flow restriction are required. When the valve is wide open, the gate is drawn into the opposite end of the valve cavity. The gate has an opening for flow through the valve the same size as the pipe in which the valve is installed. The valve provides an unobstructed passageway when fully open. It is best suited for main fluid supply lines and for pump lines, and is often used for oil and gas production where pressures may range from 5000 to 30,000 psi.

Previous versions of gate valves have featured a coating on the exterior surface of the valve's gate and seats for reducing friction, as well as to reduce corrosion and improve wear resistance. Some previous versions have utilized layers of hard facing, such as tungsten carbide, upon the surface of the valve's gate and seats. Other previous versions have utilized a vapor deposition process or a chemical vapor deposition to coat the exterior surface of the valve's gate and seats.

Prior art gate valves rely on liquid lubrication to minimize the adhesive forces between these materials. Liquid lubricants, such as hydrocarbon and silicone based greases, decrease in both viscosity and surface tension as their temperature is increased, thereby minimizing the protective boundary layer they offer to the highly loaded surfaces. Additionally, only very expensive greases are stable to temperatures above 400 F and may lose some of their mass and lubricating properties. The loss of lubrication at high temperatures leads to significant increases in valve torques and may lead to the galling of the mating surfaces.

Polymer coatings have been used on sliding load bearing surfaces in general, including on ball valves. Some polymer type coatings have been used on gate valves as well, but suffer from insufficient load bearing capacity and ductility especially at elevated temperatures. A thermoplastic polymer coating tends to creep and flow under high contact stress and elevated temperatures. A thermoset type of polymer coating does not soften with temperature as does a thermoplastic, but suffers from poor ductility and a propensity toward greater adhesion especially at elevated temperatures. These properties generally result in cracks in the coating and the removal of the coating to its mated surface.

SUMMARY

In this invention, an apparatus for a well has first and second components, each having a metal engaging surface that engages the other in a load bearing sliding contact. A polymer coating is formed on at least one of the surfaces. Preferably, the polymer coating contains a quantity of stiffening particulates having average diameters less than 0.5 microns, such as nanotubes.

The polymer coating is preferably a thermoplastic material. Also, in one embodiment, the surface containing the coating has a hardened layer under the coating. The hardened layer might be formed by nitriding, nickel aluminiding, boronizing, or carburizing. The coating is preferably applied by spray dispersion at room temperature.

BRIEF DESCRIPTION OF THE DRAWINGS

FIG. 2 is a schematic enlarged sectional view of the gate of the valve of FIG. 1, illustrating a hardened layer and a polymer coating, as sprayed onto gate and prior to heating.

FIG. 3 is a schematic enlarged sectional view of the gate as shown in FIG. 2, but after heat processing the polymer coating.

FIG. 4 is a schematic enlarged sectional view of the gate as shown in FIG. 3, but showing an alternate embodiment of the polymer coating.

DETAILED DESCRIPTION OF THE INVENTION

Figure 1:
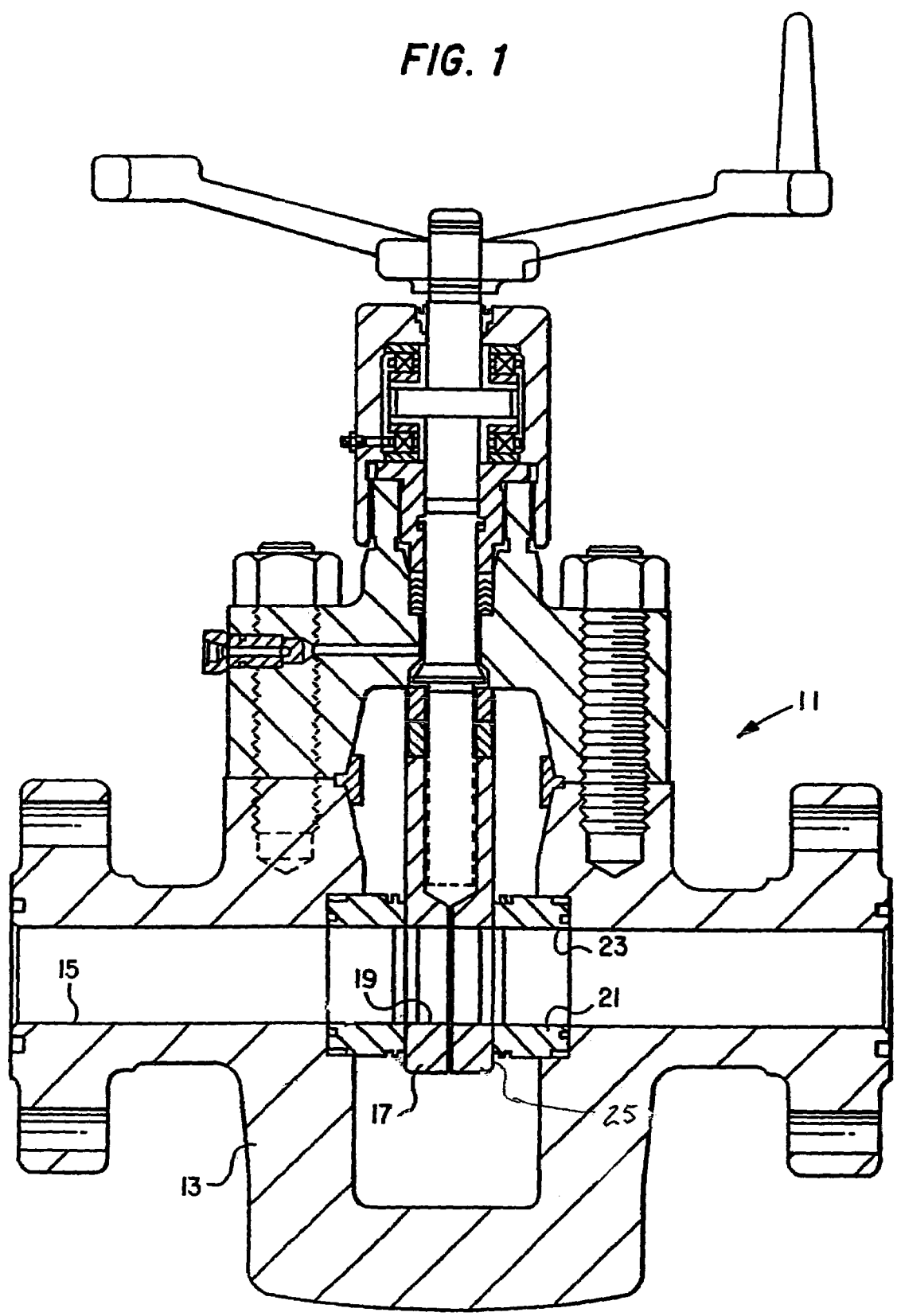
FIG. 1 is a vertical sectional view of a gate valve having a polymer coating on at least one of the interfaces between the gate and seats in accordance with the invention.

Referring to FIG. 1, gate valve 11 has a body 13 and a flow passage 15 that extends transversely through body 13. Valve 11 has a gate 17 with a hole 19 therethrough. Gate 17 is shown in the open position. The gate valve 11 shown in FIG. 1 is a non-rising-stem type valve, but the valve 11 may alternatively be a rising-stem type valve. Also shown in FIG. 1 are ring-shaped valve seats 21, which have holes 23 that register with the flow passage 15 of the valve. Gate valve 11 is shown as a split gate type having two separate slabs, but it could alternatively be a single slab type.

When gate 17 is in the open position, the hole 19 of the gate 17 registers with flow passage 15 of the valve 11, thereby allowing flow through the valve. When the gate is closed, the hole 19 no longer registers with the flow passage 15. The gate 17 has an engaging face 25 on each side that interfaces with seats 21. While gate 17 is closed, typically pressure in the flow passages 15 creates a substantial load on one of the faces 25 against one of the seats 21. Movement of gate 17 to or from the closed position causes one of the faces 25 to slide against one of the seats 21 while exerting contact forces, if one of flow passages 15 is under high pressure. The gate valve 11 shown in FIG. 1 is a forward acting gate valve meaning that gate 17 moves down to close the valve. Alternatively, the valve could be a reverse acting gate valve by repositioning the location of the gate opening.

Gate valve slab or gate 17 is preferably made from corrosion resistant steel alloys such as one of the following: Inconel (a nickel-chrome alloy of steel); high quality low alloy steel; stainless steel; nickel-cobalt alloy steel; or another suitable metal material. Inconel 625 typically has a Rockwell Hardness Number (HRN) in the C scale between 28 and 33. Inconel 718 typically has a Rockwell Hardness Number (HRN) in the C scale between 35 and 40. Material properties can be altered by the heat treatment process. Seats 21 may be formed of the same types of material.

Referring to FIG. 2, in one embodiment, each gate face 25 is subjected to an optional hardening process to create a hardened layer 27 before applying a low friction coating 29.

The hardening process may include various surface hardening techniques or diffusion processes such as nitriding, aluminiding or nickel aluminiding, boronizing, or carburizing.

Nitriding is a case-hardening process whereby nitrogen is introduced into the surface of a solid metal alloy by holding the metal at a suitable temperature in contact with a nitrogenous substance such as ammonia or nitrogen rich salt. Nitriding includes placing the gate 17 within a chamber or vat and heating the gate 17. The liquid or gas type nitriding temperature for steels is between 495 and 565° C. (925 and 1050° F.). At high temperatures, the nitrogen migrates into the metal and reacts to elements within the metal alloy to form a ceramic compound of nitride. The nitrogen most effectively reacts with titanium, chromium, or other suitable elements. Ion nitriding or Plasma Assisted CVD nitriding may be carried out at lower temperatures.

Aluminiding and boronizing follow a similar procedure whereby aluminum and boron, respectively, are introduced to the part at elevated temperatures. In vapor-phase aluminiding procedures, the evaporate aluminum introduced into the chamber reacts most effectively with nickel. In boronizing procedures, the boron introduced into the chamber reacts most effectively with iron. After the nitriding, aluminiding, boronizing, or other hardening procedure is performed on faces 25 of gate 17, the hardened layer 27 generally extends into the faces 25 of gate 17 for a depth in the range of 0.0005 inches to 0.003 inches. Coating 29 preferably has a thickness of about 0.001 or more.

Before the low friction coating 29 is applied, the surface is preferably textured slightly to create better adhesion for coating 29. The texturing procedure may occur before creating hardened layer 27 or after. The texturing procedure may be performed in a variety of ways, and is performed in one technique by a combination of sand blasting and sanding or lapping. For example, face 25 may be bead blasted with 60 grit beads, then sanded with 400 grit sandpaper. The purpose of sanding or lapping is to lower the peaks creating by the bead blasting step. Ideally, the average depths from valley to peak after sanding will be less than the thickness of the subsequent low friction coating 29 so that the peaks would be covered by coating 29. Optionally, the sanding or lapping step could be followed by another step of bead blasting, but using a smaller size of beads than in the first bead blasting step.

As an alternate to bead blasting and sanding or lapping, the surface of gate face 25 could be textured by creating a porous surface. This could be done by direct application of a laser to the metal alloy of gate face 25 to create small cavities. Additionally, micro-jets of water can be used to texture the surface as well as a variety of chemical etching or milling techniques. Alternately, a porous nickel coating or a thermal spray coating, such as a WC/Co system, could be applied.

Preferably low friction coating 29 comprises a high temperature polymer such as one of the following: PEEK (polyetheretherketone); PEK (Poletherketone); PFA (Perfluoroalkoxy); PTFE (polytetrafluoroethylene); FEP (fluorinated ethylene propylene); CTFE (polychlorotrifluoroethylene); PVDF (polyvinylidene fluoride); PA (Polyamide); PE (Polyethylene); TPU (Thermoplastic Elastomer); PPS (Polyphenylene Sulfide); PC (Polycarbonate); PPA (Polphthalamide); PEKK (Polyetherketoneketone); TPI (Thermoplastic Polyimide); PAI (polyamide-imid); PI (polyimide) or others. Preferably, the polymer is a thermoplastic, but a thermoset plastic could also be employed. A thermoplastic is defined herein as a polymer that can be repeatedly heated to its melting point. PEEK is therefore, for example, a thermoplastic and PAI is not. The preferred polymers are capable of withstanding temperatures up to 450 degrees° F. without degradation.

Also, the preferred polymers have a high strength under compressive loading. For example, some gates 17 must be capable of withstanding up to 60,000 psi of bearing stress between the seat and gate. If coating 29 has a compressive strength below that amount, it will tend to creep or become semi-liquid under high pressure. The tendency to creep is promoted as the operating temperature increases. If sufficient creep occurs, the textured subsurface of coating 29 will penetrate the top coating leading to the scratching of the mating surface, resulting in an increase in friction, an increase in coating wear, and an increase in potential leakage. Preferably, the coefficient of friction of coating 29 remains below 0.03, without supplemental liquid lubrication, for at least 200 cycles through temperature extremes to 450 F or higher. Preferably, the compressive strength is 25,000 psi at room temperature measured under the test ASTM D695, 10% deflection.

One technique to impart stiffness and creep resistance to the polymer of coating 29 is to mix a quantity of stiffening particulates in the polymer 33, such as nano-sized single or multi-wall nanotubes 31 of carbon or boron nitride. Other stiffening particulates include nano-sized fibers and micron-sized fibers such as carbon fibers.

The term "nano-sized" is used herein to mean fibers or particulates, whether tubular or solid, having a diameter of about 0.5 microns or less. Nano-sized particulates are so small that they may interact with the molecules of the polymer, thereby imparting properties not possible with other additives. Property improvements may include increases in creep resistance, compressive strength, tensile strength, wear resistance, abrasion resistance, tear resistance, explosive decompression resistance, elongation to failure, and an increase in the coatings glass transition temperature. Their small size allows them to be sprayed with conventional dispersion coating systems. Moreover, because of the small size, the nano-sized particulates do not significantly affect the surface finish of coating 29. Single and multi-wall carbon nanotubes have diameters much smaller than 0.5 micron, such as 0.015 micron. Other nano-fibers are available in size ranges approximately 10 times larger in diameter than carbon nanotubes. Nanoceramic particulates are generally spherical and may have diameters of approximately 0.05 microns.

The term "micron-sized" as used herein refers to particulates, whether fibers or granules, having diameters greater than 0.5 microns. For example, a carbon fiber might have a diameter of 8 microns. Coating 29 in the embodiment of FIGS. 2 and 3 contains a quantity of carbon nanotubes 31 as well as some micron-sized carbon fibers 35, while coating 29' in FIG. 4 does not contain micron-sized carbon fibers 35. Carbon fibers 35 have greater lengths, than the lengths of nanotubes 31; for example 150 microns versus about 20 microns for carbon nanotubes 31.

It is also beneficial to add lubricating additives to the coating mixture prior to application to reduce friction. The negative consequence of adding lubricants is to reduce the creep resistance of the coating system. This further increases the need for the creep resistance stiffening additives of the invention. Preferred lubricants may include particulates of polytetrafluoroethylene, molybdenum disulfide, graphite, tungsten disulfide, boric acid, boron nitride, fluorinated ethylene propylene, and perfluoroalkoxy.

Coating 29 is preferably applied by a dispersion technique through a conventional paint spray gun. A quantity of nanotubes 31 or nano-sized particulates are compounded with the polymer 33. The compounded material is reduced into granules 37 (FIG. 2) of sufficiently small size to be applied as a coating by electrostatic dispersion or thermal spray processes. Granules 37 have average diameters less than about 200 microns. In one embodiment, granules 37 have diameters of about 12 microns. Preferably, nanotubes 31 make up at least six percent by volume of each granule 37 to provide the desired stiffness to coating 29. One preferred range is from six to thirty percent by volume.

A surfactant and water are mixed with granules 37 to form a dispersion. Additives for lubrication enhancement may be added to the dispersion. Micron-sized fibers 35, such as carbon fibers, may optionally be added to the dispersion. If so, preferably the quantity of micron-sized fibers 35 by volume to nano-sized fibers 31, is about one to ten. The dispersion mixture is sprayed onto face 25 at room temperature. Then gate 17 is placed in a furnace and heated to a temperature of about 725 degrees F. The temperature is sufficient to melt polymer 31 but is below the first transformation temperature of the steel alloy gate 17, thus does not affect the hardness, whether or not a hardened layer 27 is used. Once cooled, coating 29 becomes solid, durable, and bonded to gate face 25. The longer micron-sized fibers 35, if used, act as reinforcing strands that bind the thermoplastic granules 37, themselves filled with nano-sized fibers 31, together.

Another method of applying the coating to a part is by the use a thermal spray process. In this process the thermoplastic granules 37, filled or not, are mixed with other solid particulates such as lubricants and larger fibers, such as carbon fibers 35. This powder mixture is then sprayed through a gun that melts the mixture before or as it is sprayed onto the part. The part therefore does not need to be thermally processed after the coating is applied.

Yet another method is to charge a dry powder mixture and apply the powder coating to the part electrostatically. The part is subsequently heated to melt and bind the particulates. This process is normally used for thick polymer coatings Multiple coatings may be applied to the part to impart unique properties. For example a first layer with microns-sized fibers, as well as other nano-sized particulates, may be applied to increase creep resistance and compression strength. A top coat without the fibers and particulates may be applied to obtain low frictional properties.

While the use of a thermoplastic is discussed in some detail, many of the methods described herein are applicable for use with thermoset materials. In particular, polyamide-imid (PAI) is a polymer that can be processed in a solution of water or solvent. Additives can be added to achieve a wide range of properties. Nanotubes or nanofibers may be added to the solution to improve coating properties. If dried at a low temperature, the PAI binder system provides for a good low temperature coating. When heated to about 500 F, the PAI reacts to form a polyimide material thereby greatly improving the thermal properties of the polymer in the coating.

Coating 29 may also be applied to the faces of seats 21 in the same manner as described in connection with gate face 25. Coating 29 could be omitted from gate face 25, or both seat 21 and gate face 25 could have a coating 29. No hydrocarbon-based liquid lubricant or grease is required in conjunction with gate face 25 and seat 21. The addition of a liquid lubricant, however, can reduce the start up friction of the valve system.

When moving the gate 17 across the seat face 21, low friction coating 29 provides for a reduced coefficient of friction, reduced wear, and galling prevention. The approximate unlubricated or dry coefficient of friction is in the range of approximately 0.01 to 0.03 even after numerous cycles of use. The low coefficient of friction reduces torque requirements to cycle the gate. Wear rates are substantially reduced during gate valve 17 operations by virtue of the coating.

Reducing the work energy and torque required to operate the gate valve effectively extends low-cost non-rising stem designs to larger sizes and higher pressure ratings without the use of complex gear reducers or expensive rolling element devices. The invention enables gate valves to better withstand contact stresses, and provides for improved wear resistance. The invention also increases the valve's operating temperature. Eliminating liquid lubricants enables the gate valve to qualify for higher temperature ratings, such as 450 degrees F. Such advantages will provide a significant cost and performance advantage over previous versions in the art.

In addition to applying coatings as described to components of a gate valve, there are other applications, particularly in connection with oil and gas well surface equipment. For example, threads of high load fasteners may contain such a coating. Fasteners of this category include bolts used to fasten sections of offshore drilling riser together. Coatings of the type described could also be used on ball valves and tensioners for tensioning offshore riser strings.

Although some embodiments of the present invention have been described in detail, it should be understood that various changes, substitutions, and alterations can be made hereupon without departing from the principle and scope of the invention. Accordingly, the scope of the present invention should be determined by the following claims and their appropriate legal equivalents.

The invention claimed is:

1. An apparatus for a well, comprising:
    first and second components, each having a metal engaging surface that engages the other in a load bearing sliding contact, at least one of the engaging surfaces being textured and thereby defining a textured engaging surface; and
    a polymer coating on at least one of the textured engaging surfaces, the polymer coating containing a quantity of stiffening particulates having an average diameter less than 0.5 microns.

2. The apparatus according to claim 1, wherein the polymer coating is a thermoplastic material.

3. The apparatus according to claim 1, wherein the quantity of stiffening particulates in the polymer comprises at least six percent by weight.

4. The apparatus according to claim 1, wherein the stiffening particulates comprise nanotubes.

5. The apparatus according to claim 1, wherein the stiffening particulates further comprise a quantity of fibers having average diameters larger than 0.5 microns.

6. The apparatus according to claim 1, wherein the stiffening particulates comprise carbon nanotubes having average diameters less than 0.5 microns and carbon fibers having average diameters greater than 0.5 microns and lengths greater than lengths of the nanotubes.

7. The apparatus according to claim 6, wherein the quantity by volume of the carbon nanotubes exceeds the quantity by volume of the carbon fibers.

8. The apparatus according to claim 1, wherein the textured engaging surface containing the coating has a hardened layer under the coating.

9. The apparatus according to claim 8, wherein the hardened layer comprises one of the following: a nitrided layer, a nickel aluminided layer, a boronized layer, or a carburized layer.

10. The apparatus according to claim 1, wherein the first and second components comprise a gate and a seat ring of a gate valve.

11. The apparatus according to claim 1, wherein the coating has a thickness that is at least one thousandth of an inch.

12. An apparatus for controlling well fluids, comprising:
a gate valve having a body, the body having a cavity and a flow passage intersecting the cavity;
a seat ring mounted to the body at the intersection of the flow passage and the cavity, the seat ring having an engaging face formed of a steel alloy;
a gate in the cavity and having an engaging face formed of a steel alloy that slidingly engages the face of the seat ring while being moved between open and closed positions, at least one of the engaging faces of the seat ring and the gate being textured and thereby defining a textured engaging face; and
a thermoplastic coating on at least one of the textured engaging faces.

13. The apparatus according to claim 12, further comprising a quantity of stiffening particulates in the coating, the stiffening particulates having an average diameter less than 0.5 microns.

14. The apparatus according to claim 12, further comprising a quantity of nanotubes contained in the coating.

15. The apparatus according to claim 12, wherein the coating contains a quantity of fibers having diameters less than 0.5 microns and a quantity of fibers having average diameters larger than 0.5 microns.

16. The apparatus according to claim 12, wherein the textured engaging face containing the coating has a hardened layer under the coating.

17. The apparatus according to claim 16, wherein the hardened layer comprises one of the following: a nitrided layer, a nickel aluminided layer, a boronized layer, or a carburized layer.

18. The apparatus according to claim 12, wherein the polymer coating has a compressive load yield strength that is at least 25,000 psi at room temperature.

19. A method of forming a coating on a metal load bearing surface, comprising:
(a) texturing the load bearing surface to create a textured surface finish;
(b) mixing with a polymer a quantity of stiffening particulates with a polymer, the stiffening particulates having average diameters less than 0.5 microns; then
(c) applying the polymer to the surface finish to create a coating.

20. The method according to claim 19, wherein step (b) comprises:
compounding the stiffening particulates with the polymer to form granules;
mixing a liquid with the granules and spraying the mixture onto the textured surface finish to create a layer; then
heating the layer to melt the polymer; then cooling the layer to cause the polymer to solidify into the coating.

21. The method according to claim 19, further comprising hardening the load bearing surface prior to step (b).

* * * * *

UNITED STATES PATENT AND TRADEMARK OFFICE
CERTIFICATE OF CORRECTION

PATENT NO. : 7,255,328 B2  Page 1 of 1
APPLICATION NO. : 11/214433
DATED : August 14, 2007
INVENTOR(S) : Rick C. Hunter It is certified that error appears in the above-identified patent and that said Letters Patent is hereby corrected as shown below:

Column 5, line 32, insert --of-- before "a thermal"

Column 8, line 15, delete "with a polymer" before "a quantity"

Signed and Sealed this

Twenty-seventh Day of November, 2007

JON W. DUDAS
*Director of the United States Patent and Trademark Office*